United States Patent
Manolakos et al.

(10) Patent No.: US 10,616,914 B2
(45) Date of Patent: Apr. 7, 2020

(54) UNICAST DATA TRANSMISSION ON A DOWNLINK COMMON BURST OF A SLOT USING MINI-SLOTS

(71) Applicant: QUALCOMM Incorporated, San Diego, CA (US)

(72) Inventors: Alexandros Manolakos, San Diego, CA (US); Jing Jiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 86 days.

(21) Appl. No.: 15/693,025

(22) Filed: Aug. 31, 2017

(65) Prior Publication Data
US 2018/0199366 A1    Jul. 12, 2018

Related U.S. Application Data

(60) Provisional application No. 62/443,397, filed on Jan. 6, 2017.

(51) Int. Cl.
| | | |
|---|---|---|
| *H04W 72/12* | (2009.01) | |
| *H04L 5/00* | (2006.01) | |
| *H04W 72/04* | (2009.01) | |

(52) U.S. Cl.
CPC ......... *H04W 72/1289* (2013.01); *H04L 5/003* (2013.01); *H04L 5/0037* (2013.01);
(Continued)

(58) Field of Classification Search
None
See application file for complete search history.

(56) References Cited

U.S. PATENT DOCUMENTS

| | | | | |
|---|---|---|---|---|
| 2006/0229083 A1* | 10/2006 | Redi | ................. | H04W 52/0216 |
| | | | | 455/453 |
| 2017/0244535 A1* | 8/2017 | Islam | .................. | H04B 7/2615 |

(Continued)

FOREIGN PATENT DOCUMENTS

| | | |
|---|---|---|
| WO | WO-2016064544 A1 | 4/2016 |
| WO | WO-2016070425 A1 | 5/2016 |

OTHER PUBLICATIONS

"3rd Generation Partnership Project; Technical Specification Group Radio Access Network; Study on New Radio (NR) Access Technology Physical Layer Aspects (Release 14)", 3GPP Draft; RP-162202 Draft TR38.802 (V1.0.0), 3rd Generation Partnership Project (3GPP), Mobile Competence Centre; 650, Route Des Lucioles; F-06921 Sophia-Antipolis Cedex; France, Dec. 4, 2016, XP051183622, Retrieved from the Internet: URL:http://www.3gpp.org/ftp/Meetings_3GPP_SYNC/RAN/Docs/ [retrieved on Dec. 4, 2016], 64 pages.

(Continued)

*Primary Examiner* — Ayaz R Sheikh
*Assistant Examiner* — Faiyazkhan Ghafoerkhan
(74) *Attorney, Agent, or Firm* — Liem T. Do

(57) ABSTRACT

A method, an apparatus, and a computer program product for wireless communication are provided. The apparatus may schedule a mini-slot for transmission of unicast data to a particular user equipment. The mini-slot may be scheduled in a portion of a downlink common burst portion of a slot. The apparatus may transmit a signal, including the unicast data, within the mini-slot.

30 Claims, 12 Drawing Sheets

(52) U.S. Cl.
CPC .......... *H04L 5/0044* (2013.01); *H04L 5/0051* (2013.01); *H04L 5/0055* (2013.01); *H04L 5/0094* (2013.01); *H04W 72/1273* (2013.01); *H04W 72/0446* (2013.01); *H04W 72/12* (2013.01)

(56) References Cited

U.S. PATENT DOCUMENTS

| | | | |
|---|---|---|---|
| 2017/0244537 A1 | 8/2017 | Yu et al. | |
| 2018/0063865 A1* | 3/2018 | Islam | H04W 76/27 |
| 2018/0091267 A1* | 3/2018 | Kim | H04L 27/26 |
| 2018/0097588 A1* | 4/2018 | Nangia | H04L 27/2613 |
| 2018/0167933 A1* | 6/2018 | Yin | H04W 72/0413 |
| 2018/0199311 A1* | 7/2018 | Yang | H04W 72/1257 |
| 2018/0368093 A1* | 12/2018 | Rahman | H04L 5/001 |
| 2019/0069312 A1* | 2/2019 | Oh | H04W 72/04 |
| 2019/0132838 A1* | 5/2019 | Yi | H04W 72/0446 |
| 2019/0190655 A1* | 6/2019 | Pan | H03M 13/356 |

OTHER PUBLICATIONS

International Search Report and Written Opinion—PCT/US2017/065750—ISA/EPO—dated Feb. 27, 2018.

LG Electronics: "Discussion on Subframe/Slot/Mini-Slot" 3GPP Draft; R1-1609235 FS, 3rd Generation Partnership Project (3GPP), Mobile Competence Centre; 650, Route Des Lucioles; F-06921 Sophia-Antipolis Cedex; France, vol. RAN WG1, No. Lisbon, Portugal; Oct. 10, 2016-Oct. 14, 2016 Oct. 9, 2016, XP051149281, Retrieved from the Internet: URL:http://www.3gpp.org/ftp/Meetings_3GPP_SYNC/RAN1/Docs/ [retrieved on Oct. 9, 2016], 6 pages.

NTT Docomo Inc: "DL Control Channel Design for NR", 3GPP Draft; R1-1612715, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 14, 2016-Nov. 18, 2016 Nov. 13, 2016, XP051176658, Retrieved from the Internet: URL:http//www.3gpp.org/ftp/Meetings_3GPP_SYNC/RAN1/Docs/ [retrieved on Nov. 13, 2016], 5 pages.

Qualcomm Incorporated: "Summary of [86-19] Discussion on Slot Structure Use Cases", 3GPP Draft; R1-1610128 Summary of 86-19 Time Domain Structure Use Case, 3rd Generation Partnership Project (3GPP), Mobile Competence Centre; 650, Route Des Lucioles; F-06921 Sophia-Antipolis Cedex; France, vol. RAN WG1, No. Lisbon, Portugal; Oct. 10, 2016-Oct. 14, 2016 Oct. 18, 2016, XP051160530, Retrieved from the Internet: URL: http://www.3gpp.org/ftp/tsg_ran/WG1_RL1/TSGR1_86b/Docs/ [retrieved on Oct. 18, 2016], 21 pages.

Qualcomm Incorporated: "Candidate Frame Structures", 3GPP Draft; R1-164695, 3rd Generation Partnership Project (3GPP), Mobile Competence Centre; 650, Route Des Lucioles; F-06921 Sophia-Antipolis Cedex; France, vol. RAN WG1, No. Nanjing, China; May 14, 2016, XP051089940, Retrieved from the Internet: URL:http://www.3gpp.org/ftp/tsg_ran/VVG1_RL1/TSGR1_85/Docs/ [retrieved on May 14, 2016], 8 pages.

* cited by examiner

UNICAST DATA TRANSMISSION ON A DOWNLINK COMMON BURST OF A SLOT USING MINI-SLOTS

CROSS REFERENCE TO RELATED APPLICATION UNDER 35 U.S.C. § 119

This application claims priority to U.S. Provisional Patent Application No. 62/443,397 filed on Jan. 6, 2017 entitled "UNICAST DATA TRANSMISSION ON A DOWNLINK COMMON BURST OF A SLOT USING MINI-SLOTS," which is incorporated by reference herein.

BACKGROUND

Field

Aspects of the present disclosure generally relate to wireless communication, and more particularly to techniques and apparatuses for unicast data transmission on a downlink common burst of a slot using mini-slots.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different wireless communication devices to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using OFDM with a cyclic prefix (CP) (CP-OFDM) on the downlink (DL), using CP-OFDM and/or SC-FDM (e.g., also known as discrete Fourier transform spread ODFM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In an aspect of the disclosure, a method, an apparatus, and a computer program product are provided.

In some aspects, the method may include scheduling, by a base station, a mini-slot for transmission of unicast data to a particular user equipment (UE), wherein the mini-slot may be scheduled in a portion of a downlink (DL) common burst portion of a slot; and transmitting, by the base station, a signal, including the unicast data, within the mini-slot.

In some aspects, the apparatus may include one or more processors configured to schedule a mini-slot for transmission of unicast data to a particular UE, wherein the mini-slot may be scheduled in a portion of a DL common burst portion of a slot; and transmit a signal, including the unicast data, within the mini-slot.

In some aspects, the apparatus may include means for scheduling a mini-slot for transmission of unicast data to a particular UE, wherein the mini-slot may be scheduled in a portion of a DL common burst portion of a slot; and means for transmitting a signal, including the unicast data, within the mini-slot.

In some aspects, the computer program product may include a non-transitory computer-readable medium storing computer executable code. The code may include code for scheduling a mini-slot for transmission of unicast data to a particular UE, wherein the mini-slot may be scheduled in a portion of a DL common burst portion of a slot; and code for transmitting a signal, including the unicast data, within the mini-slot.

Aspects generally include a method, apparatus, system, computer program product, non-transitory computer-readable medium, base station, user equipment, wireless communication device, and processing system as substantially described herein with reference to and as illustrated by the accompanying drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

DETAILED DESCRIPTION

Figure 1:
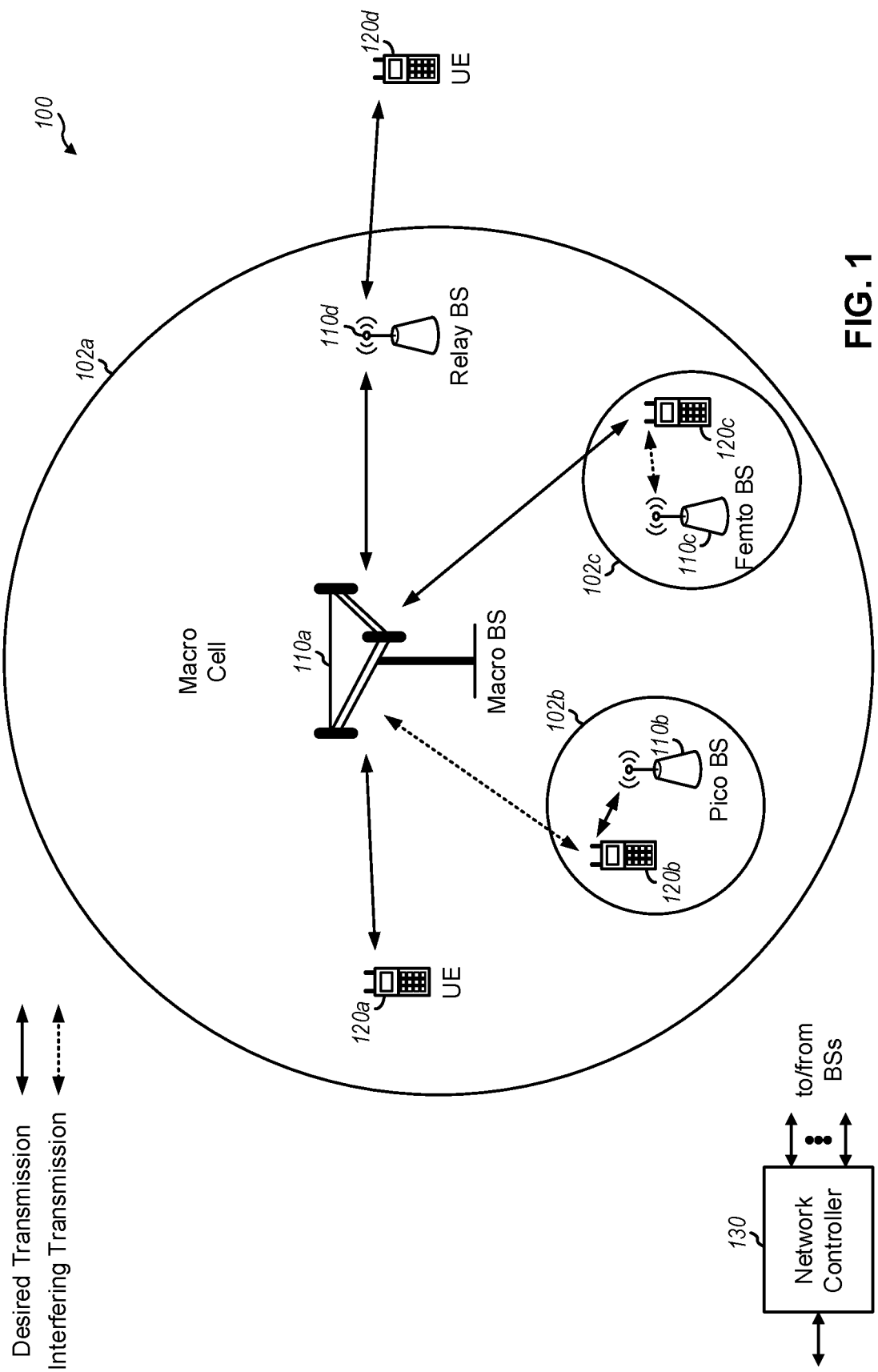
FIG. 1 is diagram illustrating an example of a wireless communication network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, and/or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

An access point ("AP") may comprise, be implemented as, or known as a NodeB, a Radio Network Controller ("RNC"), an eNodeB (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), a Node B (NB), a gNB, a 5G NB, a NR BS, a Transmit Receive Point (TRP), or some other terminology.

An access terminal ("AT") may comprise, be implemented as, or be known as an access terminal, a subscriber station, a subscriber unit, a mobile station, a remote station, a remote terminal, a user terminal, a user agent, a user device, user equipment (UE), a user station, a wireless node, or some other terminology. In some aspects, an access terminal may comprise a cellular telephone, a smart phone, a cordless telephone, a Session Initiation Protocol ("SIP") phone, a wireless local loop ("WLL") station, a personal digital assistant ("PDA"), a tablet, a netbook, a smartbook, an ultrabook, a handheld device having wireless connection capability, a Station ("STA"), or some other suitable processing device connected to a wireless modem. Accordingly, one or more aspects taught herein may be incorporated into a phone (e.g., a cellular phone, a smart phone), a computer (e.g., a desktop), a portable communication device, a portable computing device (e.g., a laptop, a personal data assistant, a tablet, a netbook, a smartbook, an ultrabook), wearable device (e.g., smart watch, smart glasses, smart bracelet, smart wristband, smart ring, smart clothing, and/or the like), medical devices or equipment, biometric sensors/devices, an entertainment device (e.g., music device, video device, satellite radio, gaming device, and/or the like), a vehicular component or sensor, smart meters/sensors, industrial manufacturing equipment, a global positioning system device, or any other suitable device that is configured to communicate via a wireless or wired medium. In some aspects, the node is a wireless node. A wireless node may provide, for example, connectivity for or to a network (e.g., a wide area network such as the Internet or a cellular network) via a wired or wireless communication link. Some UEs may be considered machine-type communication (MTC) UEs, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. Examples of MTC devices include sensors, meters, location tags, monitors, drones, robots/robotic devices, and/or the like. MTC UEs, as well as other types of UEs, may be implemented as NB-IoT (narrowband internet of things) devices.

It is noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G NB, an access point, a TRP, and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium. Some UEs may be considered evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices. Some UEs may be considered a Customer Premises Equipment (CPE).

In FIG. 1, a solid line with double arrows indicates desired transmissions between a UE and a serving BS, which is a BS designated to serve the UE on the downlink and/or uplink. A dashed line with double arrows indicates potentially interfering transmissions between a UE and a BS.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples are possible and may differ from what was described with regard to FIG. 1.

Figure 2:
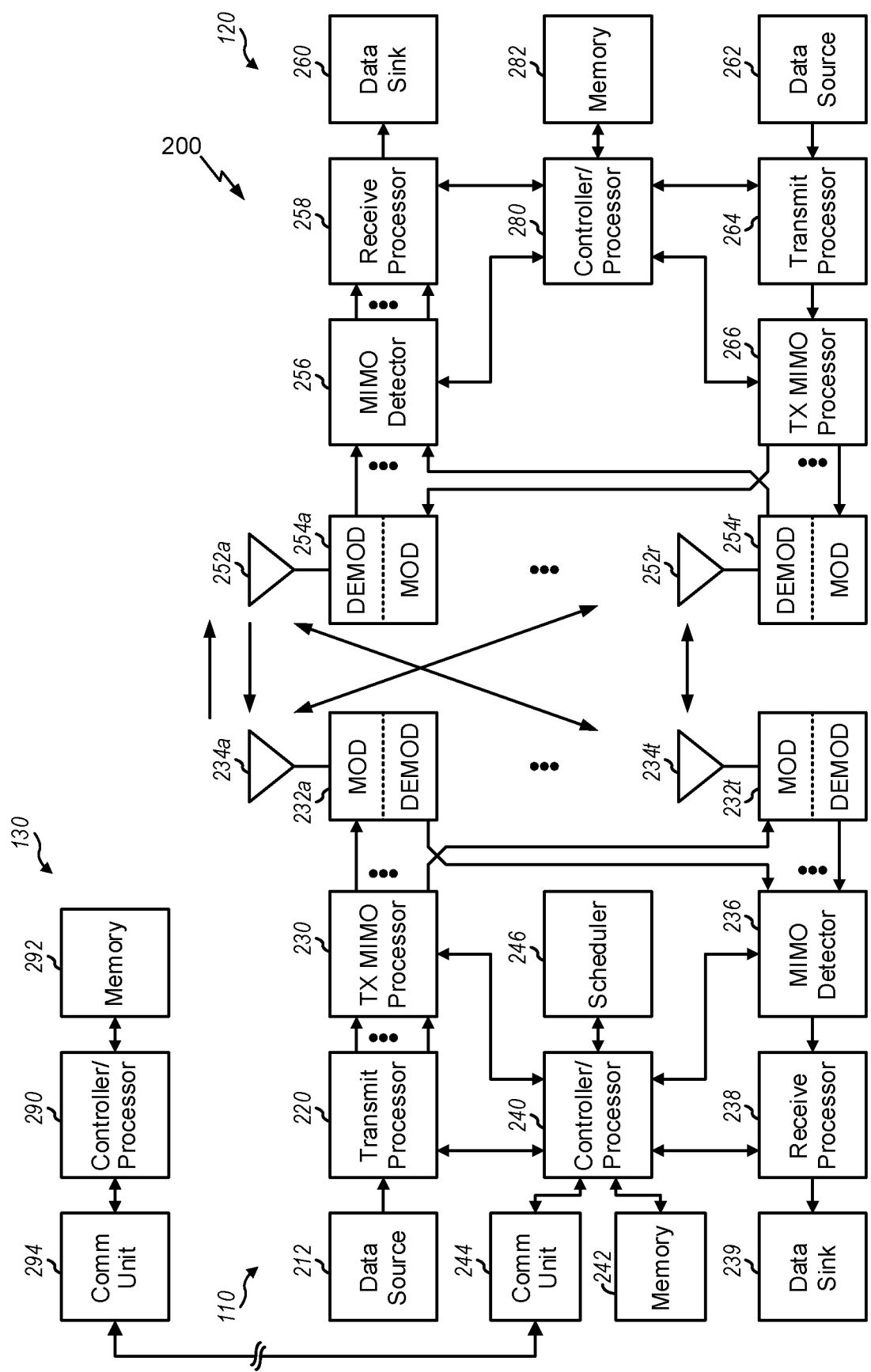
FIG. 2 is a diagram illustrating an example of a base station in communication with a user equipment (UE) in a wireless communication network.

FIG. 2 shows a block diagram of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), and/or the like) and control information (e.g., CQI requests, grants, upper layer signaling, and/or the like) and provide overhead symbols and control symbols. Transmit processor 220 may also generate reference symbols for reference signals (e.g., the CRS) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

According to certain aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controllers/processors 240 and 280 and/or any other component(s) in FIG. 2 may direct the operation at base station 110 and UE 120, respectively, to perform unicast data transmission on a downlink common burst of a slot using a mini-slot. For example, controller/processor 280 and/or other processors and modules at base station 110, may perform or direct operations of UE 120 to perform unicast data transmission on a downlink common burst of a slot using a mini-slot. For example, controller/processor 280 and/or other controllers/processors and modules at BS 110 may perform or direct operations of, for example, process 1000 of FIG. 10 and/or other processes as described herein. In some aspects, one or more of the components shown in FIG. 2 may be employed to perform example process 1000 of FIG. 10 and/or other processes for the techniques described herein. Memories 242 and 282 may store data and program codes for BS 110 and UE 120, respectively. A scheduler 246 may schedule UEs for data transmission on the downlink and/or uplink.

As indicated above, FIG. 2 is provided merely as an example. Other examples are possible and may differ from what was described with regard to FIG. 2.

Figure 3:
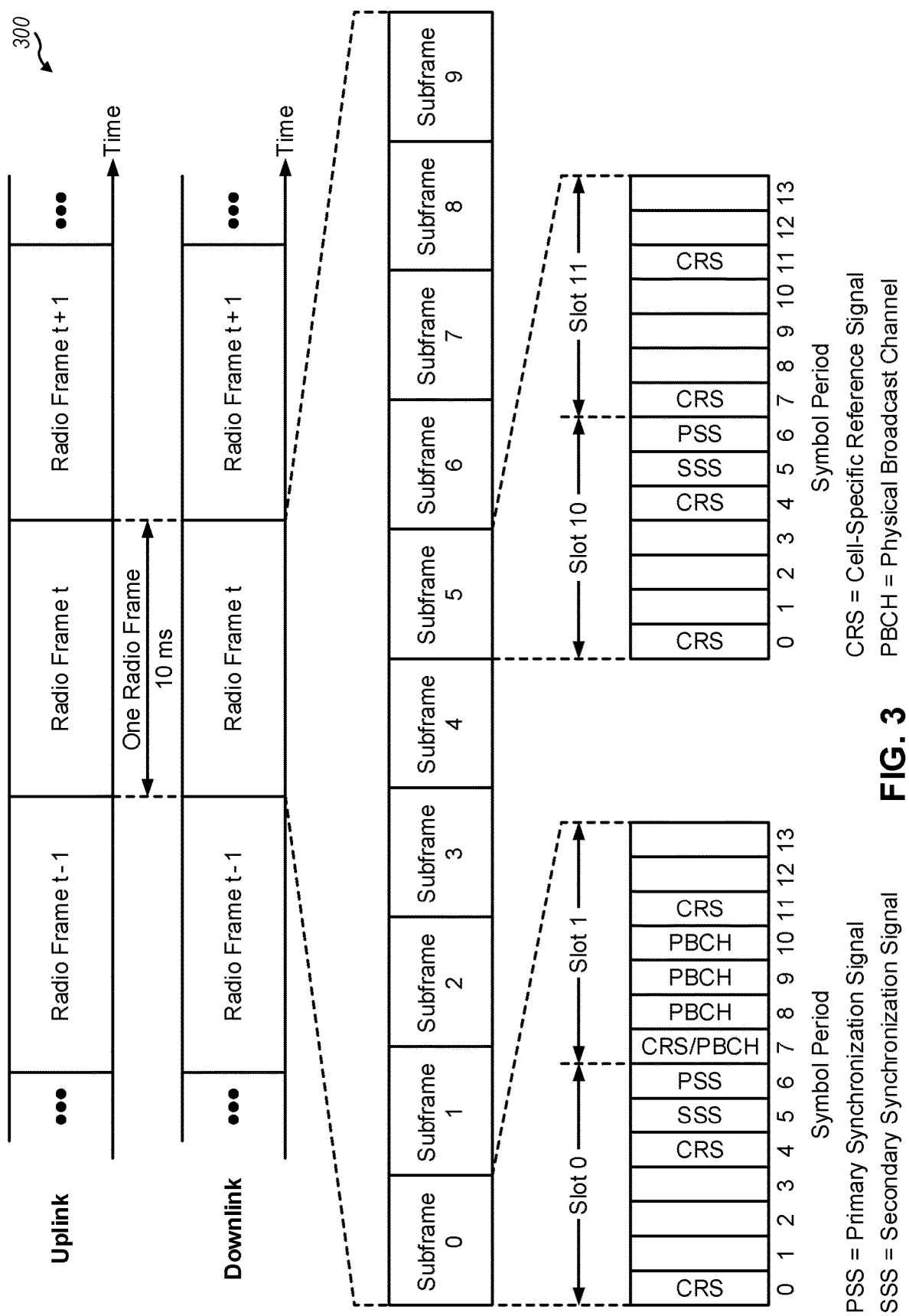
FIG. 3 is a diagram illustrating an example of a frame structure in a wireless communication network.

FIG. 3 shows an example frame structure 300 for FDD in a telecommunications system (e.g., LTE). The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol.

In certain telecommunications (e.g., LTE), a BS may transmit a primary synchronization signal (PSS) and a secondary synchronization signal (SSS) on the downlink in the center of the system bandwidth for each cell supported by the BS. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The BS may transmit a cell-specific reference signal (CRS) across the system bandwidth for each cell supported by the BS. The CRS may be transmitted in certain symbol periods of each subframe and may be used by the UEs to perform channel estimation, channel quality measurement, and/or other functions. The BS may also transmit a physical broadcast channel (PBCH) in symbol periods 0 to 3 in slot 1 of certain radio frames. The PBCH may carry some system information. The BS may transmit other system information such as system information blocks (SIBs) on a physical downlink shared channel (PDSCH) in certain subframes. The BS may transmit control information/data on a physical downlink control channel (PDCCH) in the first B symbol periods of a subframe, where B may be configurable for each subframe. The BS may transmit traffic data and/or other data on the PDSCH in the remaining symbol periods of each subframe.

In other systems (e.g., such NR or 5G systems), a Node B may transmit these or other signals in these locations or in different locations of the subframe.

As indicated above, FIG. 3 is provided merely as an example. Other examples are possible and may differ from what was described with regard to FIG. 3.

Figure 4:
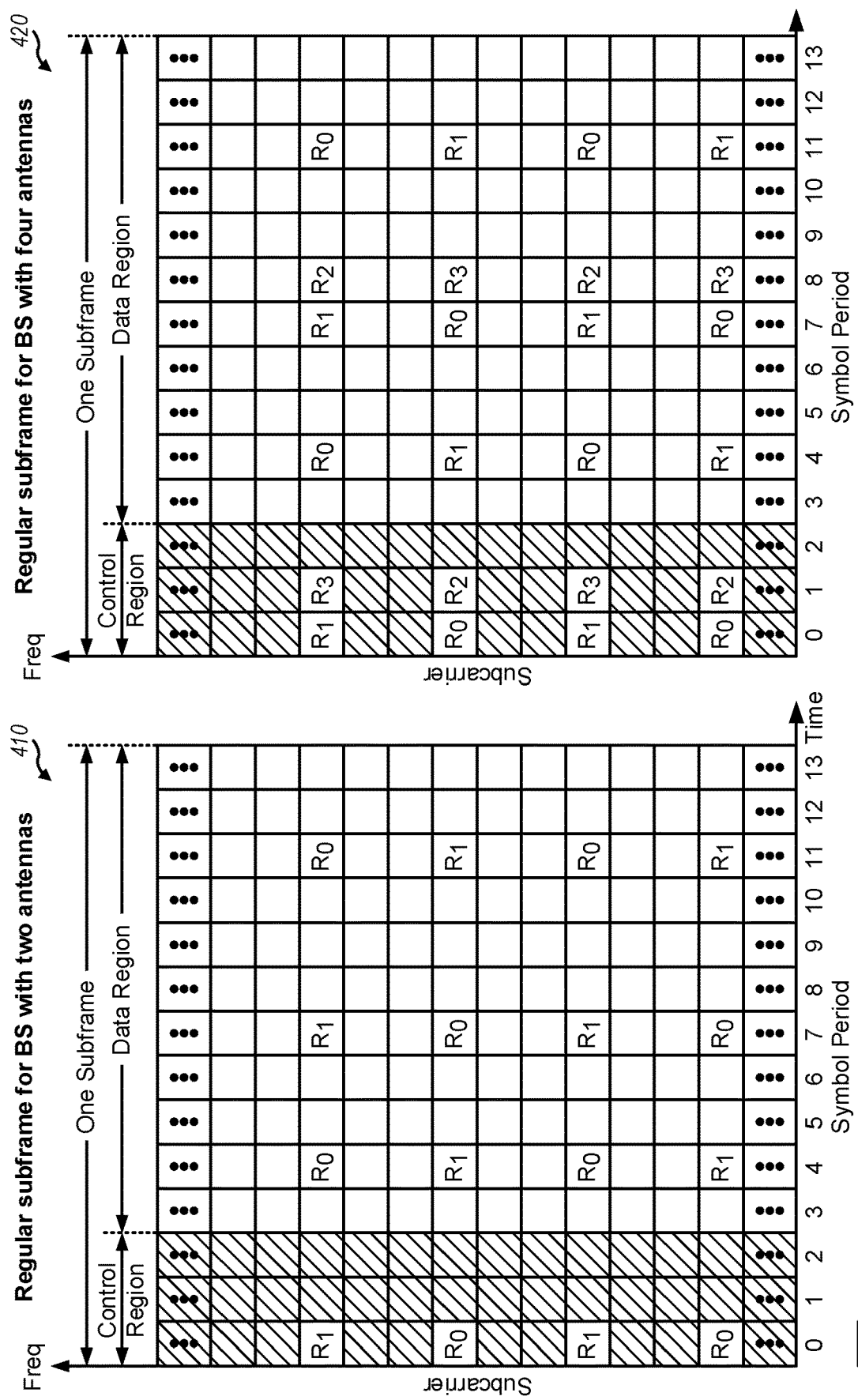
FIG. 4 is a diagram illustrating two example subframe formats with the normal cyclic prefix.

FIG. 4 shows two example subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based at least in part on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based at least in part on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in certain telecommunications systems (e.g., LTE). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, and/or the like, where $q \in \{0, \ldots, Q-1\}$.

The wireless network may support hybrid automatic repeat request (HARQ) for data transmission on the downlink and uplink. For HARQ, a transmitter (e.g., a BS) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with LTE technologies, aspects of the present disclosure may be applicable with other wireless communication systems, such as NR or 5G technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting nonbackward compatible MTC techniques, and/or mission critical targeting ultra reliable low latency communications (URLLC) service.

A single component carrier bandwidth of 100 MHZ may be supported. NR resource blocks may span 12 sub-carriers with a sub-carrier bandwidth of 75 kilohertz (kHz) over a 0.1 ms duration. Each radio frame may include 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include DL/UL data as well as DL/UL control data. UL and DL slots of subframes for NR may be as described in more detail below with respect to FIGS. 7A, 7B, 8A, and 8B.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

The RAN may include a central unit (CU) and distributed units (DUs). A NR BS (e.g., gNB, 5G Node B, Node B, transmit receive point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals—in some case cases DCells may transmit SS. NR BSs may transmit downlink signals to UEs indicating the cell type. Based at least in part on the cell type indication, the UE may communicate with the NR BS. For example, the UE may determine NR BSs to consider for cell selection, access, handover, and/or measurement based at least in part on the indicated cell type.

As indicated above, FIG. 4 is provided merely as an example. Other examples are possible and may differ from what was described with regard to FIG. 4.

Figure 5:
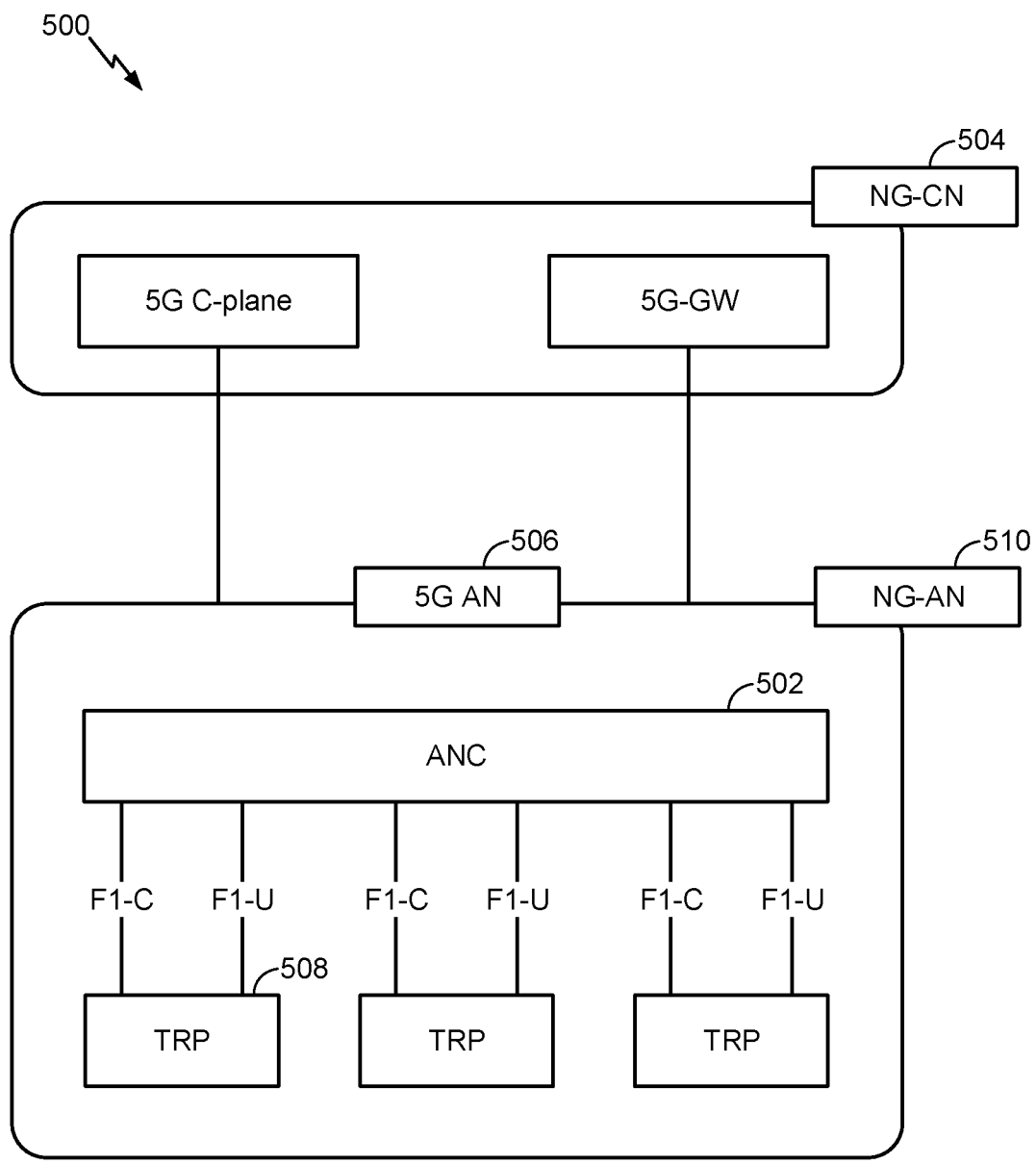
FIG. 5 is a diagram illustrating an example logical architecture of a distributed radio access network (RAN).

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The PDCP, RLC, MAC protocol may be adaptably placed at the ANC or TRP.

According to certain aspects, a BS may include a central unit (CU) (e.g., ANC 502) and/or one or more distributed units (e.g., one or more TRPs 508).

As indicated above, FIG. 5 is provided merely as an example. Other examples are possible and may differ from what was described with regard to FIG. 5.

Figure 6:
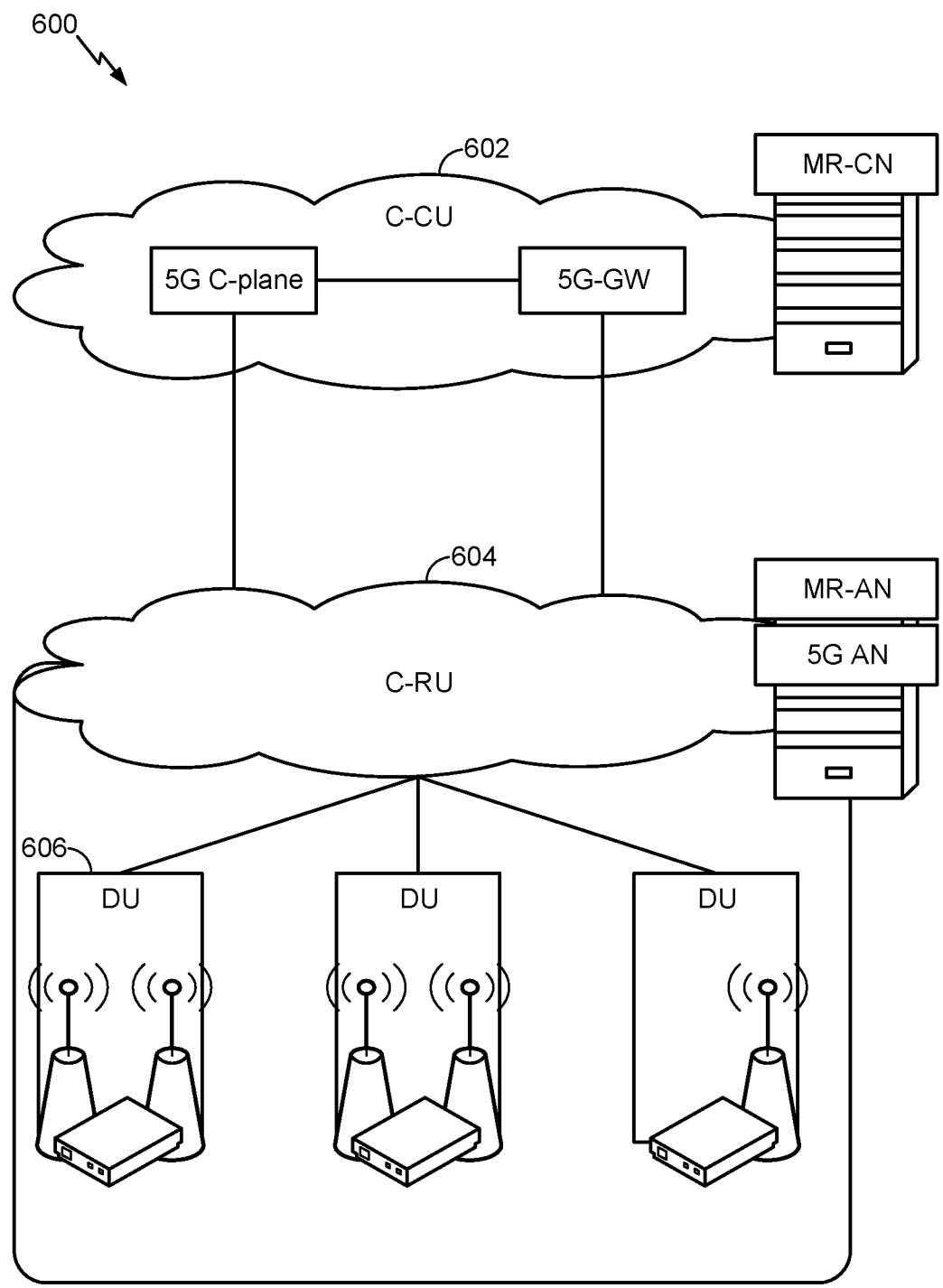
FIG. 6 is a diagram illustrating an example physical architecture of a distributed RAN.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples are possible and may differ from what was described with regard to FIG. 6.

Figure 7A:
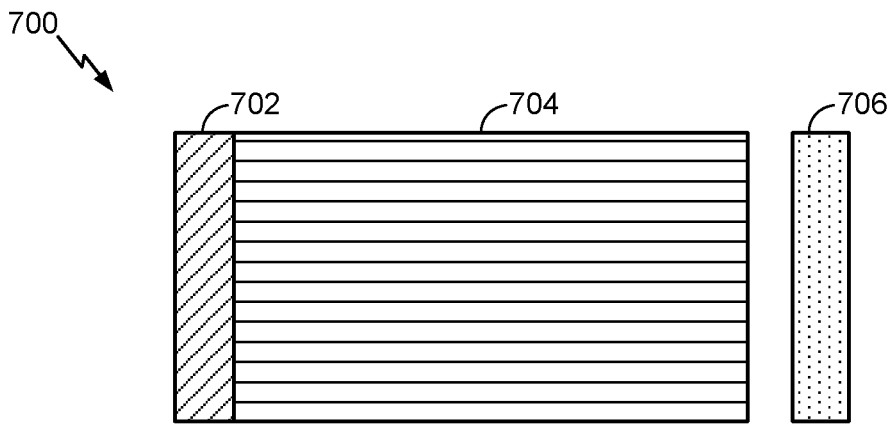
FIG. 7A is a diagram illustrating an example of a downlink (DL)-centric wireless communication structure.

FIG. 7A is a diagram 700 showing an example of a DL-centric wireless communication structure. The DL-centric wireless communication structure (referred to hereinafter as a DL-centric slot) may include a control portion 702. The control portion 702 may exist in the initial or beginning portion of the DL-centric slot. The control portion 702 may include various scheduling information and/or control information corresponding to various portions of the DL-centric slot. In some configurations, the control portion 702 may be a physical DL control channel (PDCCH), as indicated in FIG. 7A.

The DL-centric slot may also include a DL data portion 704. The DL data portion 704 may sometimes be referred to as the payload of the DL-centric slot. The DL data portion 704 may include the communication resources utilized to communicate DL data from the scheduling entity (e.g., UE or BS) to the subordinate entity (e.g., UE). In some configurations, the DL data portion 704 may be a physical DL shared channel (PDSCH).

The DL-centric slot may also include an UL short burst portion 706. The UL short burst portion 706 may sometimes be referred to as an UL burst, an UL burst portion, a common UL burst, a short burst, an UL short burst, a common UL short burst, a common UL short burst portion, and/or various other suitable terms. In some aspects, the UL short burst portion 706 may include one or more reference signals. Additionally, or alternatively, the UL short burst portion 706 may include feedback information corresponding to various other portions of the DL-centric portion. For example, the UL short burst portion 706 may include feedback information corresponding to the control portion 702 and/or the data portion 704. Non-limiting examples of information that may be included in the UL short burst portion 706 include an ACK signal (e.g., a PUCCH ACK, a PUSCH ACK, an immediate ACK), a NACK signal (e.g., a PUCCH NACK, a PUSCH NACK, an immediate NACK), a scheduling request (SR), a buffer status report (BSR), a HARQ indicator, a channel state indication (CSI), a channel quality indicator (CQI), a sounding reference signal (SRS), a demodulation reference signal (DMRS), PUSCH data, and/or various other suitable types of information. The UL short burst portion 706 may include additional or alternative information, such as information pertaining to random access channel (RACH) procedures, scheduling requests, and various other suitable types of information.

As illustrated in FIG. 7A, the end of the DL data portion 704 may be separated in time from the beginning of the UL short burst portion 706. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric wireless communication structure, and alternative structures having similar features may exist without necessarily deviating from the aspects described herein.

Figure 7B:
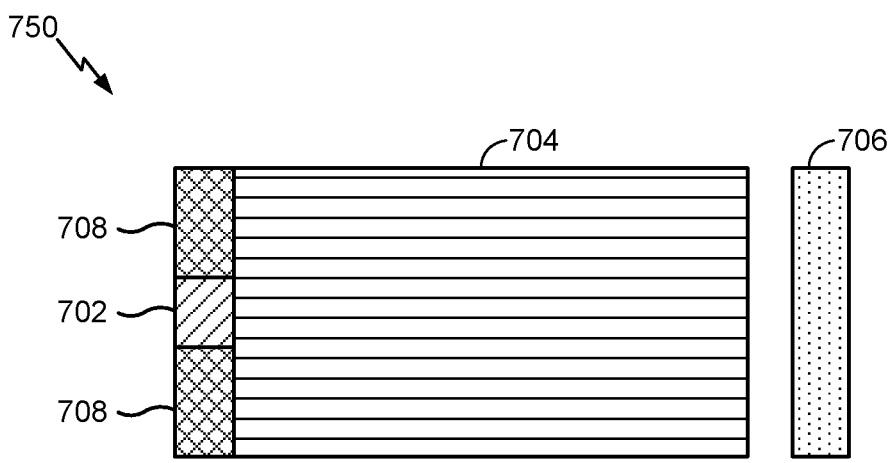
FIG. 7B is a diagram illustrating an example of a downlink (DL)-centric wireless communication structure that includes one or more mini-slots within a downlink common burst portion of the wireless communication structure.

In some aspects, the DL-centric slot may include one or more mini-slots in, for example, the control portion 702. FIG. 7B is a diagram 750 illustrating an example of a DL-centric slot that includes one or more mini-slots 708 within the control portion 702 (sometimes referred to as a DL common burst portion 702) of the DL-centric slot.

The mini-slot 708 is a unit of scheduling in NR that is smaller than a slot (i.e., a portion of the slot). For example, while an enhanced mobile broadband (eMBB) slot may include 14 symbols, the mini-slot 708 may include fewer than 14 symbols (e.g., one symbol, two symbols, four symbols, and/or the like). In some aspects, the mini-slot 708 may include one or more data symbols that represent data.

Additionally, or alternatively, the mini-slot 708 may include one or more control symbols that represent control information associated with the mini-slot 708. In some aspects, the one or more control symbols may be at or near a beginning of the mini-slot 708 (e.g., in the first two symbols of the mini-slot) or at or near an end of the mini-slot 708 (e.g., in the last symbol of the mini-slot.) Alternatively, the mini-slot 708 may not include a control symbol.

Additionally, or alternatively, the mini-slot 708 may include a reference symbol that carries information associated with demodulating data included in the mini-slot 708 (e.g., a DMRS). In some aspects, the reference symbol may be at any location within the mini-slot 708 (e.g., in a first symbol, a last symbol, and/or the like). In some aspects, the reference symbol and the control symbol may be the same symbol (i.e., a single symbol may carry the control information and the information associated with demodulating data included in the mini-slot 708).

In some aspects, the inclusion of the reference symbol in the mini-slot 708 may permit a reference symbol to be omitted from a portion of the DL data portion 704. For example, assume that the mini-slot 708 carries first data destined for a particular UE and the portion of the DL data portion 704, that uses a same frequency band as the mini-slot 708, carries second data destined for the particular UE. Here, if the mini-slot 708 includes the reference symbol, then the portion of the DL data portion 704 may not include the reference symbol. In this example, the particular UE may use the reference symbol included in the mini-slot 708 to demodulate the second data carried in the portion of the DL data portion 704. Omitting the reference symbol from the portion of the DL data portion 704 may provide for reduced latency since the particular UE may demodulate, and thereafter acknowledge, receipt of the second data without buffering the second data carried in the portion of the DL data portion 704.

Alternatively, the mini-slot 708 may not include a reference symbol. For example, assume that the mini-slot 708 carries first data destined for a particular UE, and a portion of the DL data portion 704 that uses a same frequency band as the mini-slot 708 carries second data destined for the particular UE. Here, the mini-slot 708 may not include the reference symbol when the reference symbol is included in the portion of the DL data portion 704 that carries the second data. In this example, the particular UE may buffer the first data carried in the mini-slot 708, and demodulate the first data after receiving the reference symbol in the portion of the DL data portion 704. Omitting the reference symbol from the mini-slot 708 may provide for improved robustness to mobility of the particular UE since the reference symbol is received later (e.g., near the middle) of the transmission of the first data and the second data to the particular UE.

In some aspects, the mini-slot 708 may have a subcarrier spacing that is the same as a subcarrier spacing of the slot in which the mini-slot 708 is included. Alternatively, the mini-slot 708 may have a subcarrier spacing that differs from the subcarrier spacing of the slot in which the mini-slot 708 is included. In some aspects, increasing the subcarrier spacing of the mini-slot 708 relative to the subcarrier spacing of the slot may allow for additional symbols to be included in the mini-slot 708. For example, if the mini-slot 708 has a same subcarrier spacing as the slot (e.g., 30 kilohertz (kHz)), then the mini-slot 708 may include a particular number of symbols (e.g., 2 symbols). However, if the mini-slot 708 has a subcarrier spacing that is greater than (e.g., two times) the subcarrier spacing (e.g., 2×30 kHz=60 kHz), then the mini-slot 708 may include a greater number (e.g., two times) the particular number of symbols (e.g., 2×2 symbols=4 symbols).

In some aspects, a parameter, associated with transmitting data in the mini-slot 708, may be different than a parameter associated with transmitting data in the DL data portion 704. For example, a MCS associated with data included in the mini-slot 708 (e.g., a modulation order, a coding rate, a HARQ configuration, and/or the like) may be different from a MCS associated with data included in the DL data portion 704. As another example, a number of MIMO layers, associated with the data included in the mini-slot 708, may be different from a number of MIMO layers associated with the data included in the DL data portion 704.

As shown in FIG. 7B, in some aspects, a mini-slot 708 may be included in the control portion 702 (i.e., the DL common burst portion 702) of the DL-centric slot. In some aspects, the mini-slot 708 may be used to transmit data to a particular UE. As such, in some aspects, the mini slot 708 may include unicast data (e.g., data destined for a particular UE), while the remainder of the control portion 702 may include broadcast data (e.g., data destined for multiple UEs). In other words, the portion of the control portion 702 used for mini-slot 708 may include unicast data, whereas the control portion 702 includes broadcast or multicast data.

In some aspects, the mini-slot 708 may be associated with transmitting data to a particular UE and may utilize one or more ranges of frequencies. For example, the mini-slot 708 may utilize a particular range of frequencies of the slot (e.g., a highest 30 megahertz (MHz) when a slot has a range of 80 MHz) to transmit data to the particular UE, while the DL common burst portion 702 may utilize a different range of frequencies of the slot (e.g., the remaining 60 MHz of the 80 MHz slot) to transmit control information to multiple UEs. As another example, the mini-slot 708 may utilize a first range of frequencies of the slot (e.g., the highest 30 MHz of the 80 MHz slot range) and a second range of frequencies of the slot (e.g., a lowest 30 MHz of the 80 MHz slot range) to transmit data to the particular UE, while the DL common burst portion 702 may utilize a third range of frequencies of the slot (e.g., a middle 20 MHz of the 80 MHz slot) to transmit control information to multiple UEs. In some aspects, as shown in FIG. 7B, the first range of frequencies may be separated from the second range of frequencies by the third range of frequencies.

Additionally, or alternatively, different mini-slots 708 may be associated with transmitting data to different UEs and may utilize different ranges of frequencies. For example, a first mini-slot 708 may utilize a first range of frequencies of the slot (e.g., the highest 30 MHz of the 80 MHz slot range) to transmit first data to a first particular UE, while a second mini-slot 708 may utilize a second range of frequencies of the slot (e.g., the lowest 30 MHz of the 80 MHz slot range) to transmit second data to a second particular UE. Here, the DL common burst portion 702 may utilize a third range of frequencies of the slot (e.g., the middle 20 MHz of the 80 MHz slot) to transmit control information to multiple UEs.

The foregoing is merely one example of an UL-centric wireless communication structure that includes one or more mini-slots and alternative structures having similar features may exist without necessarily deviating from the aspects described herein. Details regarding scheduling of mini-slots 708 within a DL-centric slot for transmission of unicast data to a particular UE are described below.

As indicated above, FIGS. 7A and 7B are provided merely as examples. Other examples are possible and may differ from what was described with regard to FIGS. 7A and 7B. Further, while FIGS. 7A and 7B are DL-centric slots may be used for NR technology, another type of radio access technology (e.g., LTE) may use a subframe for a similar purpose and/or in a similar manner as that described in association with the DL-centric slots of FIGS. 7A and 7B.

Figure 8A:
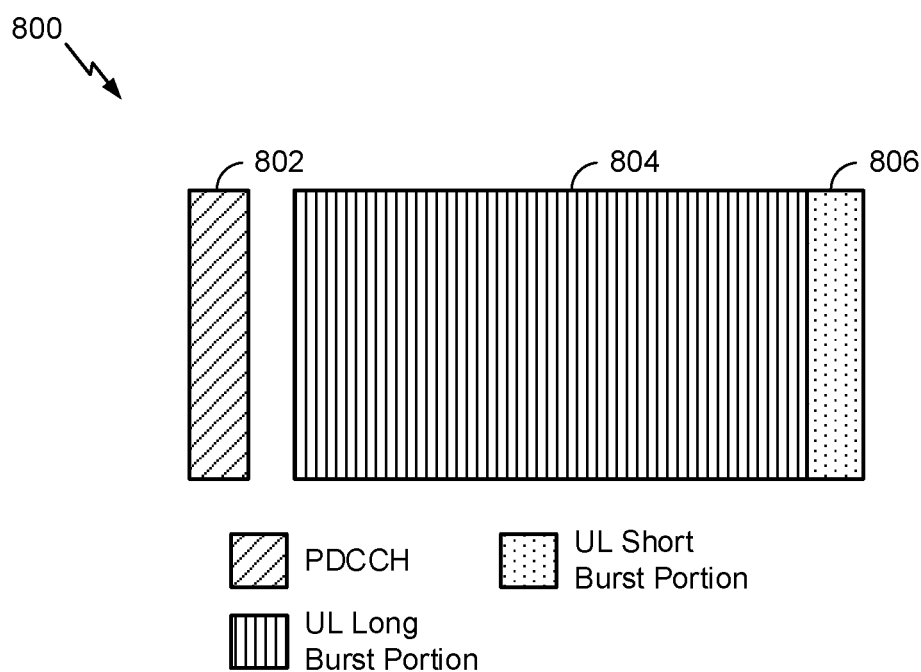
FIG. 8A is a diagram illustrating an example of an uplink (UL)-centric wireless communication structure.

FIG. 8A is a diagram 800 showing an example of an UL-centric wireless communication structure. The UL-centric wireless communication structure (referred to hereinafter as an UL-centric slot) may include a control portion 802. The control portion 802 may exist in the initial or beginning portion of the UL-centric slot. The control portion 802 in FIG. 8A may be similar to the control portion 702 described above with reference to FIG. 7A. In some configurations, the control portion 802 (sometimes referred to as DL common burst portion 802) may be a physical DL control channel (PDCCH).

The UL-centric slot may also include an UL long burst portion 804. The UL long burst portion 804 may sometimes be referred to as the payload of the UL-centric slot. The UL long burst portion 804 may refer to the communication resources utilized to communicate UL data from the subordinate entity (e.g., UE) to the scheduling entity (e.g., UE or BS).

As illustrated in FIG. 8A, the end of the control portion 802 may be separated in time from the beginning of the UL long burst portion 804. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric slot may also include an UL short burst portion 806. The UL short burst portion 806 in FIG. 8A may be similar to the UL short burst portion 706 described above with reference to FIG. 7A, and may include any of the information described above in connection with FIG. 7A. The foregoing is merely one example of an UL-centric wireless communication structure and alternative structures having similar features may exist without necessarily deviating from the aspects described herein.

Figure 8B:
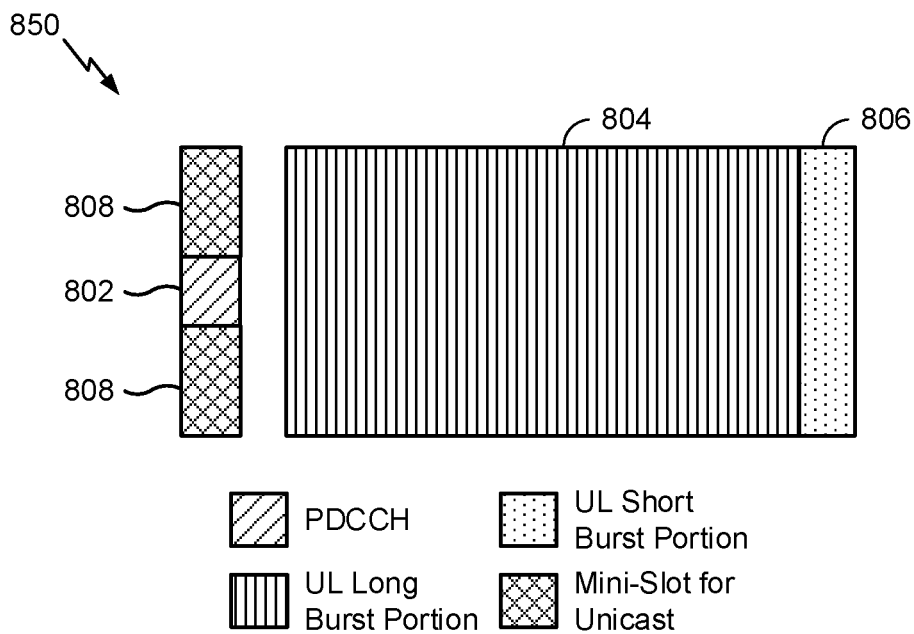
FIG. 8B is a diagram illustrating an example of an uplink (UL)-centric wireless communication structure that that includes one or more mini-slots within a downlink common burst portion of the wireless communication structure.

In some aspects, the UL-centric slot may include one or more mini-slots in, for example, the control portion 802. FIG. 8B is a diagram 850 illustrating an example of a UL-centric slot that includes one or more mini-slots 808 within the control portion 802 (sometimes referred to as a DL common burst portion 802) of the UL-centric slot. The mini-slot 808 in FIG. 8B may be similar to the mini-slot 708 described above with reference to FIG. 7B, and may include any information described in connection with FIG. 7B. The foregoing is merely one example of an UL-centric wireless communication structure that includes one or more mini-slots, and alternative structures having similar features may exist without necessarily deviating from the aspects described herein. Details regarding scheduling of mini-slots 808 within a UL-centric slot for transmission of unicast data to a particular UE are described below.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

In one example, a wireless communication structure, such as a frame, may include both UL-centric slots and DL-centric slots. In this example, the ratio of UL-centric slots to DL-centric slots in a frame may be dynamically adjusted based at least in part on the amount of UL data and the amount of DL data that are transmitted. For example, if there is more UL data, then the ratio of UL-centric slots to DL-centric slots may be increased. Conversely, if there is more DL data, then the ratio of UL-centric slots to DL-centric slots may be decreased.

As indicated above, FIGS. 8A and 8B are provided merely as examples. Other examples are possible and may differ from what was described with regard to FIGS. 8A and 8B. Further, while FIGS. 8A and 8B are UL-centric slots that may be used for NR technology, another type of radio access technology (e.g., LTE) may use a subframe for a similar purpose and/or in a similar manner as that described in association with the UL-centric slots of FIGS. 8A and 8B.

As described above, a control portion of a slot (e.g., control portion 702 or control portion 802 of a DL-centric slot or an UL-centric slot, respectively) may include one or more mini-slots (e.g., mini-slots 708 or 808) for transmitting data (e.g., unicast data) to a particular UE. Use of the mini-slots within the control portion to transmit such data may permit a latency and/or a reliability requirement of a service (e.g., a low latency service, an ultra-reliable low-latency communication (URLLC) service, and/or the like) to be satisfied without impacting network performance. For example, when the control portion of the slot utilizes only a portion of the control portion (e.g., a middle 20 MHz of an 80 MHz range), use of one or more other portions of the control portion as mini-slots to transmit URLLC data to a particular UE may improve the URLLC service, as provided to the particular UE, by allowing for reduced latency and/or improved reliability (without negatively impacting network performance). In some aspects, BS 110 may schedule such mini-slots for transmissions of unicast data within DL-centric and/or UL-centric slots.

In some aspects, the mini-slots may be used for service that requires (e.g., due to a HARQ configuration of the particular UE 120) an acknowledgement (e.g., an ACK) to be transmitted in a same slot as a data transmission. Here, BS 110 may schedule a mini-slot for a transmission to the particular UE 120 (e.g., UE 120 with the HARQ configuration) in order to allow the particular UE 120 to provide an acknowledgment in the same slot. Notably, BS 110 can schedule data on the data portion of the slot, but a service requiring the same-slot acknowledgment may need to be scheduled on the mini-slot depending on HARQ configurations supported by the particular UE 120. For example, if the particular UE 120 does not support transmitting a same-slot acknowledgement for data received in the data portion of the slot, but is capable of doing so for the mini-slot, then BS 110 should schedule the data for transmission in the mini-slot.

Figure 9:
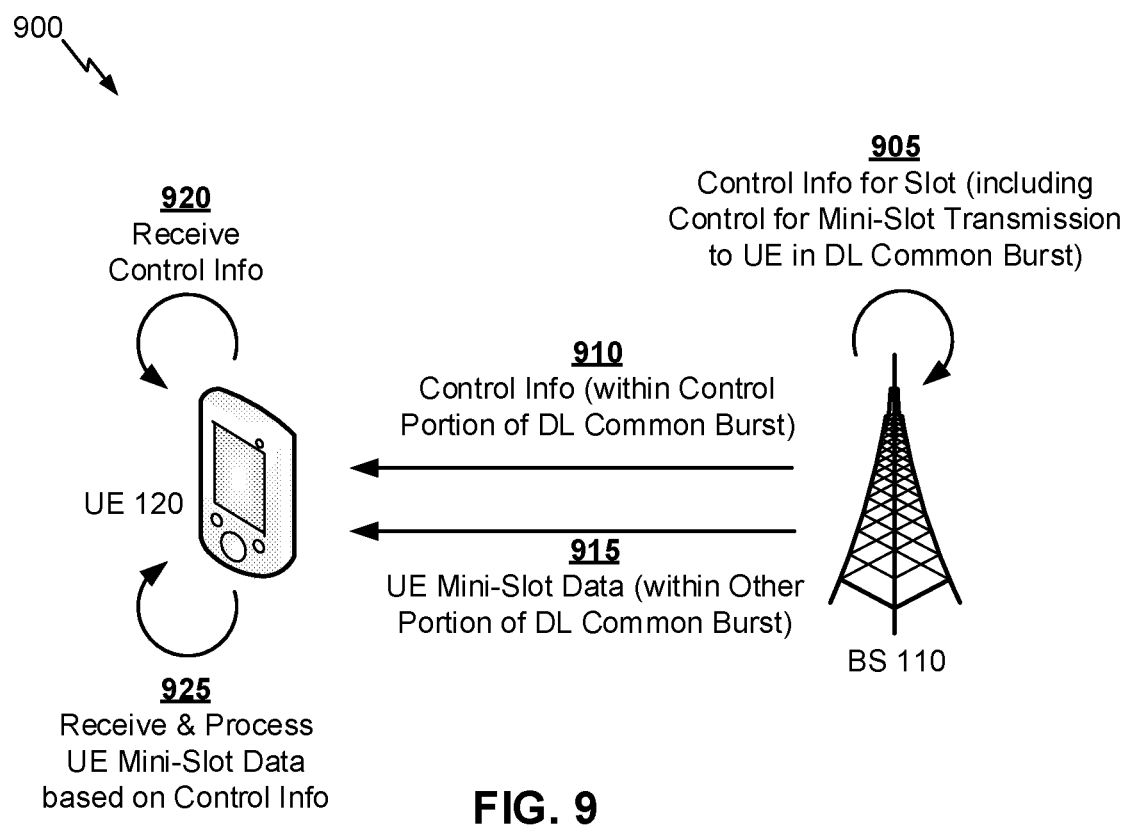
FIG. 9 is a diagram illustrating an example of scheduling a mini-slot for transmitting unicast data in a portion of a downlink common burst portion of a slot, and transmitting the unicast data within the mini-slot.

FIG. 9 is a diagram illustrating an example 900 of scheduling a mini-slot for transmitting data in a portion of a DL common burst portion of a slot, and transmitting the data within the mini-slot. Notably, while example 900 describes techniques associated with scheduling a mini-slot within a DL-centric slot, these techniques may be similarly applied in association with scheduling a mini-slot within an UL-centric slot.

As shown in FIG. 9, and by reference number 905, BS 110 may identify control information that includes information associated with one or more transmissions of data within a slot. The control information may include, for example, information that identifies a set of radio resources corresponding to one or more transmissions of data within DL data portion the slot (i.e., a set of radio resources corresponding to each transmission in the DL data portion), information that identifies UEs 120 associated with each of the one or more transmissions in the DL data portion of the slot, and/or the like. In some aspects, such control information allows each UE 120 to identify radio resources, within the DL data portion, that include data destined for the UE 120.

In some aspects, the control information may include information associated with one or more mini-slots, where each mini-slot may be used to transmit data to a different particular UE 120.

Additionally, or alternatively, the control information may include information that identifies a set of radio resources corresponding to one or more transmissions of data in a mini-slot in the control portion of the slot (i.e., a set of radio resources in the control portion that will be used to transmit the data), information that identifies a particular UE 120 to which the data is to be transmitted, and/or the like. In some aspects, such control information allows the particular UE 120 to determine that BS 110 will transmit data to the particular UE 120 using the mini-slot, included in the control portion of the slot, that is described by the control information.

In some aspects, the particular UE 120 for which a mini-slot is scheduled may have a portion of a DL data portion 704 scheduled for another transmission to the particular UE 120. Alternatively, the particular UE 120 for which a mini-slot is scheduled may not have a portion of a DL data portion 704 scheduled for another transmission to the particular UE 120 (i.e., the particular UE 120 may be scheduled for a transmission using only the mini-slot).

In some aspects, BS 110 may determine the control information based on a scheduler of BS 110 (e.g., scheduler 246) that schedules UEs 120 for data transmissions on the downlink and/or uplink.

As shown by reference number 910, BS 110 may transmit the control information within a control portion of a DL common burst. For example, BS 110 may transmit the control information within a portion of control portion 702 (i.e., a DL common burst) of a DL-centric slot. As another example, BS 110 may transmit the control information within a portion of control portion 802 (i.e., a DL common burst) of an UL-centric slot.

In some aspects, as described above, the portion of the DL common burst used to transmit the control information may be less than the entire DL common burst portion of the slot. For example, BS 110 may transmit the control information using radio resources associated with a particular range of frequencies that is less than an entire range of frequencies associated with the slot (e.g., a middle 20 kHz of an 80 kHz slot).

In this way, BS 110 may schedule the mini-slot for transmission of data to the particular UE in a portion of a DL common burst of a slot.

As further shown in FIG. 9, and by reference number 915, BS 110 may transmit a signal including the data (sometimes referred to as transmitting the data), destined for the particular UE 120, within the mini-slot (e.g., using other radio resources corresponding of the mini-slot) of the DL common burst portion of the slot.

In some aspects, BS 110 may transmit the control information and the mini-slot data in a same slot (i.e., within a same DL common burst of a DL-centric or UL-centric slot). Additionally, or alternatively, BS 110 may transmit the control information in a first slot (e.g., a within a DL common burst portion of a DL-centric or UL-centric slot) and may transmit the signal including mini-slot data in a second slot (e.g., within a DL common burst portion of a subsequent DL-centric or UL-centric slot).

As described above, in some aspects, BS 110 may transmit a DMRS within the mini-slot, or may transmit the DMRS within a DL data portion of the slot (e.g., when the portion of the DL data portion that uses a same frequency band as the mini-slot carries additional data destined for the particular UE 120).

In some aspects, in the case of DL-centric slot, BS 110 may transmit a signal including other data in the DL data portion of the slot (e.g., after transmitting the control information and the mini-slot data in the DL common burst) in the typical manner. In the case of an UL-centric slot, BS 110 may await receipt of UL data, transmitted by UEs 120 in the UL data portion of the UL-centric slot.

As shown by reference number 920, the particular UE 120 may receive the control information transmitted by BS 110 in the DL common burst. In some aspects, the particular UE 120 may process the control information and identify, based at least in part on the control information, that the mini-slot is being used to transmit data to the particular UE 120 (e.g., within the same slot or a subsequent slot). In this way, the particular UE 120 may determine that the mini-slot, included in the DL common burst, is being used to transmit data to the particular UE 120.

As shown by reference number 925, based at least in part on identifying that the mini-slot is being used to transmit the data to the particular UE 120, the particular UE 120 may receive the data within the mini-slot included in the DL common burst portion, and may process (e.g., demodulate, decode, and/or the like) the data within the mini-slot included in the DL common burst portion of the slot.

In some aspects, based on receiving and processing the mini-slot data, the particular UE 120 may provide, to BS 110, an acknowledgement (e.g., an ACK signal) and/or another type of response associated with the data transmitted in the mini-slot. In some aspects, the particular UE 120 may provide the acknowledgment in the same slot as that of the mini-slot. In the case of an UL-centric slot, the particular UE 120 may provide the acknowledgement in the UL short burst portion or the UL data portion of the UL-centric slot. In the case of a DL-centric slot, the particular UE 120 may provide the acknowledgment in the UL short burst portion of the DL-centric slot. Here, the acknowledgment may, in some aspects, be a joint acknowledgment of both the data transmitted to the particular UE 120 in the mini-slot and other data transmitted to the particular UE 120 in the DL data portion of the DL-centric slot. This may occur when the particular UE 120 receives two downlink grants (e.g., a downlink grant for the mini-slot and a downlink grant for the data portion of the slot) and the particular UE 120 jointly acknowledges for both grants. In such a case, BS 110 and the particular UE 120 need to agree that such a HARQ configuration and acknowledgement reporting is allowed, which may necessitate signaling between BS 110 and the particular UE 120. In some aspects, such signaling may be semi-static or dynamic, where the nature of the signaling may depend on a length, a duration, and/or an amount of resources available in the UL-common burst portion of the slot.

In some aspects, the particular UE 120 may provide the acknowledgement in a subsequent slot.

In some aspects, if the data transmitted to the particular UE 120 using the mini-slot is not successfully receive and/or processed by the particular UE 120 (e.g., causing the particular UE to provide a NACK signal to BS 110), then BS 110 may retransmit the data. In such a case, BS 110 may retransmit the data in another mini-slot (e.g., included in a DL common burst portion of a later DL-centric or UL-centric slot) or in a DL data portion of a later DL-centric slot. Notably, the data need not be retransmitted in another mini-slot.

As indicated above, FIG. 9 is provided as an example. Other examples are possible and may differ from what was described with respect to FIG. 9.

Figure 10:
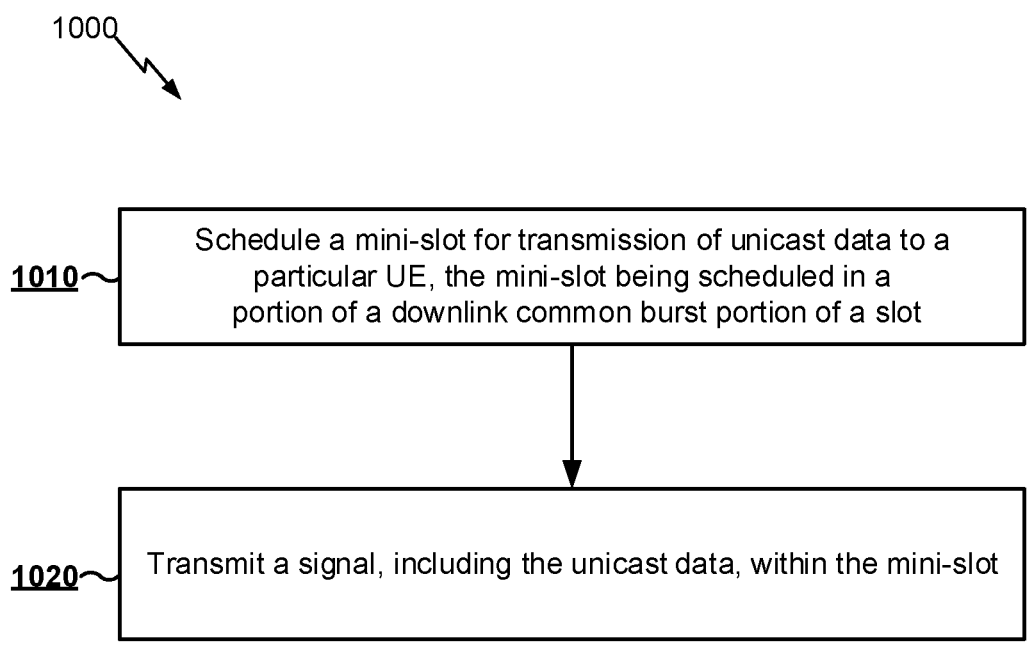
FIG. 10 is a flow chart of a method of wireless communication.

FIG. 10 is a flow chart of a process 1000 of wireless communication. The process may be performed by a base station (e.g., the BS 110 of FIG. 1, access node 506 of FIG. 5, apparatus 1102 of FIG. 11, apparatus 1102' of FIG. 12, and/or the like).

At 1010, the base station may schedule a mini-slot for transmission of unicast data to a particular UE, the mini-slot being scheduled in a portion of a DL common burst portion of a slot. In some aspects, the base station may identify control information the control information may include information that identifies a set of radio resources corresponding to one or more transmissions of data in a mini-slot in the DL common burst portion of the slot (i.e., a set of radio resources in the control portion that will be used to transmit the data), information that identifies the particular UE to which the data is to be transmitted, and/or the like.

In some aspects, the base station may transmit the control information within a control portion of a DL common burst. For example, the base station may transmit the control information within a portion of a DL common burst portion of a DL-centric slot or an UL-centric slot. In some aspects, the particular UE may receive the control information and may identify that the particular UE is to receive the data in the mini-slot that is included in the DL common burst portion of the slot.

At 1020, the base station may transmit a signal, including the unicast data, within the mini-slot. In some aspects, the base station may transmit a signal, including unicast data, destined for the particular UE, within the mini-slot (e.g., using other radio resources corresponding of the mini-slot) of the DL common burst portion of the slot.

In some aspects, the base station may transmit the control information and the mini-slot data in a same slot (i.e., within a same DL common burst of a DL-centric or UL-centric slot). Additionally, or alternatively, the base station may transmit the control information in a first slot (e.g., within a DL common burst portion of a DL-centric or UL-centric slot) and may transmit the mini-slot data in a second slot (e.g., within a DL common burst portion of a subsequent DL-centric or UL-centric slot). In some aspects, the particular UE may process the data, included in the mini-slot within the DL common burst, based at least in part on receiving the control information transmitted by the base station.

In some aspects, the base station may schedule a mini-slot for transmission of unicast data to a particular UE, wherein the mini-slot may be scheduled in a portion of a DL common burst portion of a slot, and the base station may transmit a signal, including the unicast data, within the mini-slot.

In some aspects, scheduling the mini-slot may include identifying control information associated with scheduling the mini-slot, wherein the control information may be transmitted, by the base station, within at least one of another portion of the DL common burst portion of the slot or a portion of a DL common burst portion of another slot.

In some aspects, the base station may transmit a DMRS within the mini-slot, and the DMRS may be used to demodulate data within a data portion of the slot associated with the particular UE. Alternatively, the base station may transmit the DMRS within the data portion of the slot associated with the particular UE, and the DMRS may be used to demodulate data within the mini-slot. In such aspects, the DMRS and the data should be pre-coded in a similar manner within both the mini-slot and the slot. In some aspects, signaling between the base station and the particular UE may specify whether the DMRS signal transmitted within the mini-slot is to be used to demodulate data within a data portion of the slot, or whether the DMRS transmitted within the data portion of the slot is to be used to demodulate the unicast data within the mini-slot, wherein the signaling may be semi-static or dynamic depending on mobility of the particular UE or configurations (e.g., HARQ configurations) of the mini-slot and the slot. In some aspects, if the mini-slot transmission is required to acknowledged in a same slot as the mini-slot, then the DMRS should be transmitted in the mini-slot rather than the data portion of the slot.

In some aspects, the mini-slot may be associated with a first frequency range and a second frequency range, wherein the first frequency range and the second frequency range are separated by a frequency range of a control portion of the DL common burst portion.

In some aspects, the mini-slot may be a first mini-slot, the unicast data may be first unicast data, the particular UE may be a first particular UE, and the portion of the DL common burst portion may be a first portion of the DL common burst portion, and the base station may schedule a second mini-slot transmission of second unicast data to a second particular UE. Here, the second mini-slot may be scheduled in a second portion of the DL common burst portion, and the second unicast data may be included in the signal within the second mini-slot. In some aspects, the first mini-slot may be associated with a first frequency range and the second mini-slot may be associated with a second frequency range, wherein the first frequency range and the second frequency range are separated by a frequency range of a control portion of the DL common burst portion.

In some aspects, the unicast data may be associated with an ultra-reliable low-latency communication service.

In some aspects, the slot is a DL-centric slot.

In some aspects, the base station may receive an acknowledgement, associated with the unicast data transmitted in the mini-slot, in an UL common burst portion of the slot, wherein the acknowledgement may be provided by the particular UE. In some aspects, the acknowledgement may be a joint acknowledgement that includes an acknowledgement associated with other data transmitted in a data portion of the slot. In some aspects, signaling between the base station and the particular UE may cause the base station and the particular UE to agree that a joint acknowledgment is permitted, wherein the signaling is semi-static or dynamic depending on a length, a duration, or an amount of resources available in the uplink common burst portion of the slot.

In some aspects, the base station may retransmit the unicast data within at least one of a data portion of the slot, a data portion of another slot, or a mini-slot in the other slot.

In some aspects, a parameter, associated with the transmission of the unicast data within the mini-slot, may be different from a parameter associated with the transmission of other data in a data portion of the slot, wherein the parameter may include a MCS or a number of MIMO layers.

In some aspects, the slot may be an UL-centric slot. Here, an acknowledgement, associated with the unicast data transmitted in the mini-slot, may be received in a data portion of the slot.

In some aspects, a length of the mini-slot may be one symbol or two symbols. In some aspects, the length of the mini-slot may be implicitly signaled to be the same as the length of the DL common burst portion of the slot. In this case, no explicit notification is needed regarding the length of the mini-slot. In some aspects, the length of the DL-common burst may be semi-statically configurable and, therefore, the length of the mini-slot may be adjusted accordingly. In some aspects, whether the length of the mini-slot is the same length as the DL common burst portion of the slot may be determined based on signaling (e.g., semi-static signaling) between the base station and the particular UE.

In some aspects, a frequency range of the mini-slot of the DL common burst portion may differ from a frequency range used for a control portion of the DL common burst portion of the slot.

In some aspects, the particular UE may not be not scheduled to receive data in a data portion (e.g., a regular data portion) of the slot.

In some aspects, a UE may receive a signal, including unicast data, within a mini-slot, wherein the mini-slot may be received in a portion of a DL common burst portion of a slot, and the UE may process the unicast data within the mini-slot of the DL common burst portion of the slot. In some aspects, the UE may transmit a response, associated with the unicast data, in the slot or in a subsequent slot.

Although FIG. 10 shows example blocks of a method of wireless communication, in some aspects, the method may include additional blocks, fewer blocks, different blocks, or differently arranged blocks than those shown in FIG. 10. Additionally, or alternatively, two or more blocks shown in FIG. 10 may be performed in parallel.

Figure 11:
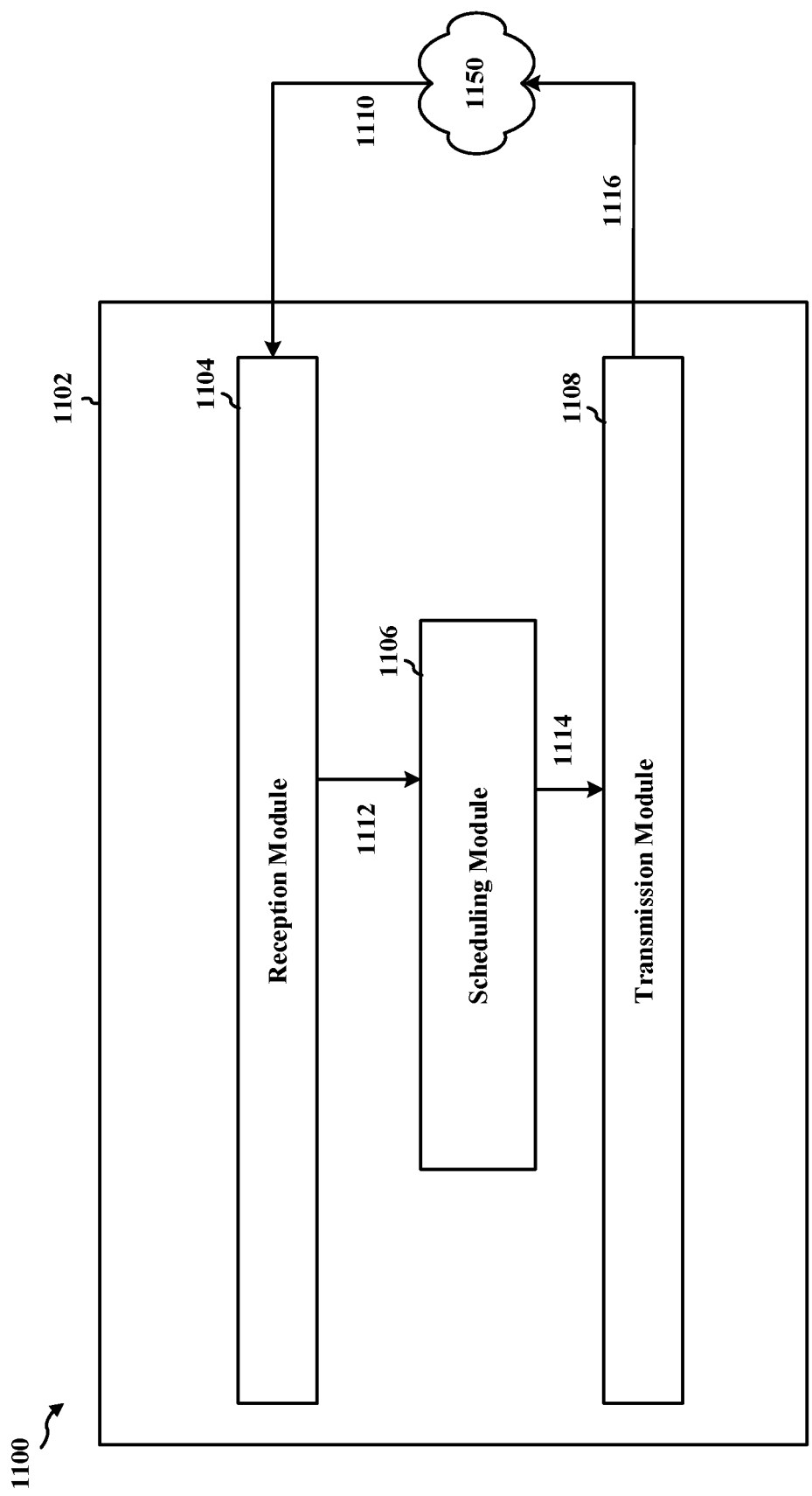
FIG. 11 is a conceptual data flow diagram illustrating the data flow between different modules/means/components in an example apparatus.

FIG. 11 is a conceptual data flow diagram 1100 illustrating the data flow between different modules/means/components in an example apparatus 1102. The apparatus 1102 may be a base station, such as BS 110, 5G access node 506, and/or the like. In some aspects, the apparatus 1102 includes a reception module 1104, a scheduling module 1106, and/or a transmission module 1108.

The reception module 1104 may receive data 1110 from a network 1150, such as data transmitted by one or more one or more other network entities. In some aspects, the reception module 1104 may provide data 1112 to the scheduling module 1106. In some aspects, the data 1112 may indicate that the scheduling module 1106 is to schedule, in a portion of a downlink common burst portion of a slot, a mini-slot for transmitting unicast data to a particular UE. The scheduling module 1106 may schedule, in a portion of a downlink common burst portion of a slot, a mini-slot for transmitting the unicast data to the particular UE.

The scheduling module 1106 may provide data 1114 to the transmission module 1108. For example, the scheduling module 1106 may provide data 1114, including control information associated with scheduling the mini-slot, to transmission module 1108. The transmission module 1108 may transmit data 1116, including the control information to network 1150 and/or to the particular UE within the slot. The data 1116 may also include the unicast data associated with the particular.

The apparatus may include additional modules that perform each of the blocks of the algorithm in the aforementioned flow chart of FIG. 10. As such, each block in the aforementioned flow chart of FIG. 10 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 11 are provided as an example. In practice, there may be additional modules, fewer modules, different modules, or differently arranged modules than those shown in FIG. 11. Furthermore, two or more modules shown in FIG. 11 may be implemented within a single module, or a single module shown in FIG. 11 may be implemented as multiple, distributed modules. Additionally, or alternatively, a set of modules (e.g., one or more modules) shown in FIG. 11 may perform one or more functions described as being performed by another set of modules shown in FIG. 11.

Figure 12:
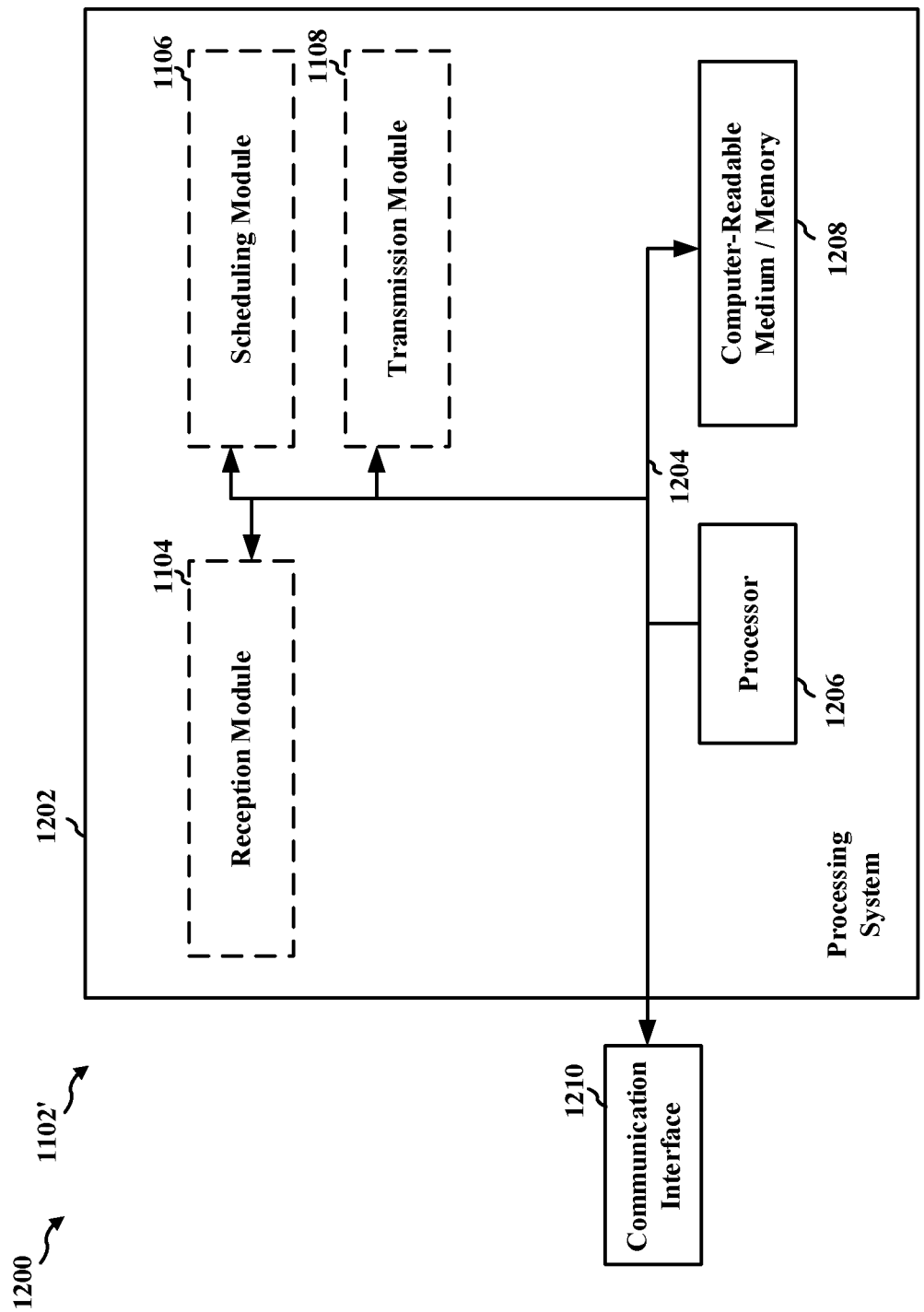
FIG. 12 is a diagram illustrating an example of a hardware implementation for an apparatus employing a processing system.

FIG. 12 is a diagram 1200 illustrating an example of a hardware implementation for an apparatus 1102' employing a processing system 1202. The apparatus 1102' may be a base station, such as BS 110, 5G access node 506, and/or the like.

The processing system 1202 may be implemented with a bus architecture, represented generally by the bus 1204. The bus 1204 may include any number of interconnecting buses and bridges depending on the specific application of the processing system 1202 and the overall design constraints. The bus 1204 links together various circuits including one or more processors and/or hardware modules, represented by the processor 1206, the modules 1104, 1106, 1108, and the computer-readable medium/memory 1208. The bus 1204 may also link various other circuits such as timing sources, peripherals, voltage regulators, and power management circuits, which are well known in the art, and therefore, will not be described any further.

The processing system 1202 may be coupled to a communication interface 1210. The communication interface 1210 provides a means for communicating with various other apparatus over a transmission medium. The communication interface 1210 receives a signal from via the transmission medium, extracts information from the received signal, and provides the extracted information to the processing system 1202, specifically the reception module 1104. In addition, the communication interface 1210 receives information from the processing system 1202, specifically the transmission module 1108, and based at least in part on the received information, generates a signal to be applied to the transmission medium. The processing system 1202 includes a processor 1206 coupled to a computer-readable medium/memory 1208. The processor 1206 is responsible for general processing, including the execution of software stored on the computer-readable medium/memory 1208. The software, when executed by the processor 1206, causes the processing system 1202 to perform the various functions described supra for any particular apparatus. The computer-readable medium/memory 1208 may also be used for storing data that is manipulated by the processor 1206 when executing software. The processing system further includes at least one of the modules 1104, 1106, and 1108. The modules may be software modules running in the processor 1206, resident/stored in the computer readable medium/memory 1208, one or more hardware modules coupled to the processor 1206, or some combination thereof. The processing system 1202 may be a component of the BS 110 and may include the memory 242 and/or at least one of the TX MIMO processor 230, the RX processor 238, and/or the controller/processor 240.

In some aspects, the apparatus 1102/1102' for wireless communication includes means for scheduling a mini-slot for transmission of unicast data to a particular UE, where the mini-slot may be scheduled in a portion of a DL common burst portion of a slot; and means for transmitting a signal, including the unicast data, within the mini-slot. The aforementioned means may be one or more of the aforementioned modules of the apparatus 1102 and/or the processing system 1202 of the apparatus 1102' configured to perform the functions recited by the aforementioned means. As described supra, the processing system 1202 may include the TX MIMO processor 230, the RX processor 238, and/or the controller/processor 240. As such, in one configuration, the aforementioned means may be the TX processor 230, the RX processor 238, and/or the controller/processor 240 configured to perform the functions recited by the aforementioned means.

FIG. 12 is provided as an example. Other examples are possible and may differ from what was described in connection with FIG. 12.

It is understood that the specific order or hierarchy of blocks in the processes/flow charts disclosed is an illustration of example approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
   scheduling, by a base station, a first mini-slot for transmission of first data to a first user equipment (UE) and a second mini-slot for transmission of second data to a second UE,
   the first data being unicast data,
   the first mini-slot being scheduled in a first range of frequencies of a downlink (DL) common burst portion of a slot,
   the second mini-slot being scheduled in a second range of frequencies of the DL common burst portion;
   the slot including an uplink (UL) short burst portion, and
   the UL short burst portion being for providing feedback information corresponding to the DL common burst portion; and transmitting, by the base station, a signal, including the first data, within the first mini-slot.

2. The method of claim 1,
wherein scheduling the first mini-slot comprises identifying control information associated with scheduling the first mini-slot, and
wherein the control information is transmitted within at least one of:
another portion of the DL common burst portion of the slot, or
a portion of a DL common burst portion of another slot.

3. The method of claim 1, wherein a demodulation reference signal (DMRS) is transmitted within the first mini-slot and is used to demodulate data within a data portion of the slot associated with the first UE, or is transmitted within the data portion of the slot and is used to demodulate the unicast data within the first mini-slot.

4. The method of claim 3,
wherein signaling between the base station and the first UE specifies whether the DMRS transmitted within the first mini-slot is to be used to demodulate data within a data portion of the slot, or whether the DMRS transmitted within the data portion of the slot is to be used to demodulate the first data within the first mini-slot, and
wherein the signaling is semi-static or dynamic depending on mobility of the first UE or hybrid automatic repeat request (HARD) configurations of the first mini-slot and the slot.

5. The method of claim 1,
wherein the first range of frequencies and the second range of frequencies are separated by a frequency range of a control portion of the DL common burst portion.

6. The method of claim 1, wherein the second data is included in the signal within the second mini-slot.

7. The method of claim 1,
further comprising:
utilizing a third range of frequencies, of the DL common burst portion, to transmit control information to multiple UEs.

8. The method of claim 1, wherein the unicast data is associated with a low latency service, an ultra-reliable low-latency communication service, or a service which requires an acknowledgment to be transmitted during a same slot as the unicast data.

9. A device for wireless communication, comprising:
memory; and
one or more processors configured to:
schedule a first mini-slot for transmission of first data to a first user equipment (UE) and a second mini-slot for transmission of second data to a second UE,
the first data being unicast data,
the first mini-slot being scheduled in a first range of frequencies of a downlink (DL) common burst portion of a slot,
the second mini-slot being scheduled in a second range of frequencies of the DL common burst portion;
the slot including an uplink (UL) short burst portion, and
the UL short burst portion including feedback information corresponding to the DL common burst portion; and
transmit a signal, including the first data, within the first mini-slot.

10. The device of claim 9,
wherein the one or more processors, when scheduling the first mini-slot, are configured to identify control information associated with scheduling the first mini-slot; and
wherein the control information is transmitted within at least one of:
another portion of the DL common burst portion of the slot, or
a portion of a DL common burst portion of another slot.

11. The device of claim 9, wherein a demodulation reference signal (DMRS) is transmitted within the first mini-slot and is used to demodulate data within a data portion of the slot associated with the first UE, or is transmitted within the data portion of the slot and is used to demodulate the unicast data within the first mini-slot.

12. The device of claim 11,
wherein signaling between the device and the first UE specifies whether the DMRS transmitted within the first mini-slot is to be used to demodulate data within a data portion of the slot, or whether the DMRS transmitted within the data portion of the slot is to be used to demodulate the unicast data within the first mini-slot, and
wherein the signaling is semi-static or dynamic depending on mobility of the first UE or hybrid automatic repeat request (HARD) configurations of the first mini-slot and the slot.

13. The device of claim 9,
wherein the first range of frequencies and the second range of frequencies are separated by a frequency range of a control portion of the DL common burst portion.

14. The device of claim 9, wherein the second data is included in the signal within the second mini-slot.

15. The device of claim 9, wherein the one or more processors are further configured to:
utilize a third range of frequencies, of the DL common burst portion, to transmit control information to multiple UEs.

16. The device of claim 9, wherein the unicast data is associated with a low latency service, an ultra-reliable low-latency communication service, or a service which requires an acknowledgment to be transmitted during a same slot as the unicast data.

17. A non-transitory computer-readable medium storing instructions for wireless communication, the instructions comprising:
one or more instructions that, when executed by one or more processors of a base station, cause the one or more processors to:
schedule a first mini-slot for transmission of first data to a first user equipment (UE) and a second mini-slot for transmission of second data to a second UE,
the first data being unicast data,
the first mini-slot being scheduled in a first range of frequencies of a downlink (DL) common burst portion of a slot,
the second mini-slot being scheduled in a second range of frequencies of the DL common burst portion;
the slot including an uplink (UL) short burst portion, and
the UL short burst portion being for providing feedback information corresponding to the DL common burst portion; and
transmit a signal, including the first data, within the first mini-slot.

18. The non-transitory computer-readable medium of claim 17,
wherein the one or more instructions, that cause the one or more processors to schedule the first mini-slot, cause the one or more processors to identify control information associated with scheduling the first mini-slot, and
wherein the control information is transmitted within at least one of:
another portion of the DL common burst portion of the slot, or
a portion of a DL common burst portion of another slot.

19. The non-transitory computer-readable medium of claim 17, wherein a demodulation reference signal (DMRS) is transmitted within the first mini-slot and is used to demodulate data within a data portion of the slot associated with the first UE, or is transmitted within the data portion of the slot and is used to demodulate the unicast data within the first mini-slot.

20. The non-transitory computer-readable medium of claim 19,
wherein signaling between the base station and the first UE specifies whether the DMRS transmitted within the first mini-slot is to be used to demodulate data within a data portion of the slot, or whether the DMRS transmitted within the data portion of the slot is to be used to demodulate the unicast data within the first mini-slot, and
wherein the signaling is semi-static or dynamic depending on mobility of the first UE or hybrid automatic repeat request (HARD) configurations of the first mini-slot and the slot.

21. The non-transitory computer-readable medium of claim 17,
wherein the first range of frequencies and the second range of frequencies are separated by a frequency range of a control portion of the DL common burst portion.

22. The non-transitory computer-readable medium of claim 17, wherein the second data is included in the signal within the second mini-slot.

23. The non-transitory computer-readable medium of claim 17, wherein the one or more instructions further cause the one or more processors to:
utilize a third range of frequencies, of the DL common burst portion, to transmit control information to multiple UEs.

24. An apparatus for wireless communication, comprising:
means for scheduling a first mini-slot for transmission of first data to a first user equipment (UE) and a second mini-slot for transmission of second data to a second UE,
the first data being unicast data,
the first mini-slot being scheduled in a first range of frequencies of a downlink (DL) common burst portion of a slot,
the second mini-slot being scheduled in a second range of frequencies of the DL common burst portion;
the slot including an uplink (UL) short burst portion, and
the UL short burst portion being for providing feedback information corresponding to the DL common burst portion; and
means for transmitting a signal, including the first data, within the first mini-slot.

25. The apparatus of claim 24,
wherein the means for scheduling the first mini-slot comprises means for identifying control information associated with scheduling the first mini-slot, and
wherein the control information is transmitted within at least one of:
another portion of the DL common burst portion of the slot, or
a portion of a DL common burst portion of another slot.

26. The apparatus of claim 24, wherein a demodulation reference signal (DMRS) is transmitted within the first mini-slot and is used to demodulate data within a data portion of the slot associated with the first UE, or is transmitted within the data portion of the slot and is used to demodulate the unicast data within the first mini-slot.

27. The apparatus of claim 26,
wherein signaling between the apparatus and the first UE specifies whether the DMRS transmitted within the first mini-slot is to be used to demodulate data within a data portion of the slot, or whether the DMRS transmitted within the data portion of the slot is to be used to demodulate the first data within the first mini-slot, and
wherein the signaling is semi-static or dynamic depending on mobility of the first UE or hybrid automatic repeat request (HARD) configurations of the first mini-slot and the slot.

28. The apparatus of claim 24,
wherein the first range of frequencies and the second range of frequencies are separated by a frequency range of a control portion of the DL common burst portion.

29. The apparatus of claim 24, wherein the second data is included in the signal within the second mini-slot.

30. The apparatus of claim 24,
further comprising:
means for utilizing a third range of frequencies, of the DL common burst portion, to transmit control information to multiple UEs.

* * * * *